United States Patent
Legoll et al.

(10) Patent No.: US 7,908,122 B2
(45) Date of Patent: Mar. 15, 2011

(54) SIGNAL PROCESSING DEVICE FOR SYSTEMS IN DIFFERENTIAL CONFIGURATION

(75) Inventors: Sébastien Legoll, Bourg les Valence (FR); Patrice Guillard, Valence (FR)

(73) Assignee: Thales (FR)

( * ) Notice: Subject to any disclaimer, the term of this patent is extended or adjusted under 35 U.S.C. 154(b) by 468 days.

(21) Appl. No.: 12/126,865

(22) Filed: May 24, 2008

(65) Prior Publication Data

US 2008/0294385 A1    Nov. 27, 2008

(30) Foreign Application Priority Data

May 25, 2007 (FR) ...................... 07 03734

(51) Int. Cl.
*H03F 1/26* (2006.01)
(52) U.S. Cl. ..................................... 702/189
(58) Field of Classification Search .................. 702/189, 702/49; 342/357.25; 455/456.5; 375/148
See application file for complete search history.

(56) References Cited

U.S. PATENT DOCUMENTS

| | | | | |
|---|---|---|---|---|
| 5,146,414 | A * | 9/1992 | McKown et al. | 702/49 |
| 7,453,923 | B2 * | 11/2008 | Leblond et al. | 375/148 |
| 2008/0129586 | A1 * | 6/2008 | Martin | 342/357.03 |
| 2008/0214212 | A1 * | 9/2008 | Pridmore et al. | 455/456.5 |

FOREIGN PATENT DOCUMENTS

WO    WO94/24573    10/1994

OTHER PUBLICATIONS

Regtien, P P L et al.: "Measurement Science for Engineers", 2004 Butterworth-Heinemann, XP002463195 , section 3.6, introduction, p. 79, dernier paragraphe—p. 81, premier paragraphe, figures 3.16 et 3.17.
Bentley D J P: "Principles of Measurements Systems (Fourth Edition)", 2004, Prentice Hall, XP002463196, pp. 42; figures 3.5(b).
Morris A S: "Measurement and Instrumentation Principles", 2001, Butterworth-Heinemann, XP002463197, section 3.3.2; figure 3.2.

* cited by examiner

*Primary Examiner* — Drew A Dunn
*Assistant Examiner* — Xiuquin Sun
(74) *Attorney, Agent, or Firm* — Lowe Hauptman Ham & Berner, LLP

(57) ABSTRACT

A signal measurement and processing device includes two systems allowing a signal and its opposite to be simultaneously received at the input and two signals able to take polynomial form, as a function of the input signals, to be returned. The device includes means for performing a weighted sum and difference of the two output signals in such a manner that at least the weighted sum is independent to a first order of the variations in the input signals. This processing operation is particularly well adapted to systems subjected to spurious effects such as thermal drifts.

5 Claims, 1 Drawing Sheet

SIGNAL PROCESSING DEVICE FOR SYSTEMS IN DIFFERENTIAL CONFIGURATION

RELATED APPLICATIONS

The present application is based on, and claims priority from, French Application Number 07 03734, filed May 25, 2007, the disclosure of which is hereby incorporated by reference herein in its entirety.

BACKGROUND OF THE INVENTION

1. Field of the Invention

The field of the invention is that of signal processing for systems disposed in differential configuration. Differential configuration is understood to mean a configuration where two systems allow a variable representing a parameter and its opposite to be generated simultaneously.

This configuration allows certain errors to be avoided or to be significantly reduced. This method is particularly suited to the processing of signals coming from measurement sensors where the measurement may be both tainted by noise and be subjected to spurious effects like thermal drifts. The correction for thermal drifts is indeed a major problem in measurement systems. There exist numerous physical principles where a variable, an output signal and its opposite may be readily obtained. Resonant mechanical devices, certain optical devices, electrical or electronic devices will notably be mentioned. To give a simple example, if the movements of an object, which may be a plate, a beam or a membrane, are measured, a displacement of +d of a first side of this object and of −d of the other side is obtained.

2. Description of the Prior Art

The general case where a single system processes the information is presented in FIG. 1. The system S receives, as input, the signal y to be analysed. S returns the output signal u which is modulated by the input y. S also receives noise terms b which form spurious terms on the output u. A processing operation ST enables u to be demodulated in order to obtain a signal X varying according to a polynomial function with y, this variation law being obtained in an exact or approximate manner.

The following may thus be written:
$X = X_0 f(y)$ with $f(y)$ a polynomial equal to 1 for $y=0$, $X_0$ forming the quiescent output of the processing operation, in other words for a zero input signal.

In order to determine y starting from X, $X_0$ must be known together with the coefficients of f. These parameters are linked to the characteristic physical dimensions of S and may be determined by calibration, but they can vary as a function, for example, of temperature.

If, in order to determine y starting from X, the numerical values for $X_0$ and the coefficients of f determined during the calibration, which was carried out at a temperature that may be different from the effective temperature of the system at the moment when the latter returns the information X, are simply used, an error is committed in the estimation of y which may be incompatible with the degree of precision required. Conventionally, this error is decomposed into two terms:
- a zero-bias error corresponding to the error in the estimation of y for a zero input;
- a scale factor error varying as a function of the value of the input.

In addition, the noise present in the system S leads to noise in the estimation of y which may also be incompatible with the required precision.

Finally, in the case where the processing operation allowing X to be determined starting from u is a digital processing operation, the clock noise involved in the system sampling will cause additional noise in X.

SUMMARY OF THE INVENTION

The goal of the invention is to provide a method based on the employment of two systems in differential configuration that will allow:
- the temperature of the system to be determined and thus the capability of estimating y starting from X by compensating for the effect of the temperature on the parameters of the system;
- the effects of the noise components comprising the clock noise and the noise added in the system S to be reduced.

More precisely, the subject of the invention is a signal measurement and processing device comprising at least:
  a first system receiving a first signal y and first processing means delivering a first output signal $X_1$, the said output signal being of the form $X_1 = X_{0,1} \cdot f_1(y)$ with $f_1(y)$ a first polynomial in y of the form $$f_1(y) = 1 + \sum_{i=1}^{N} f_{i,1} \cdot y^i$$

$f_{i,1}$ being the coefficients of the said polynomial;
  a second system configured so as to receive a second signal −y substantially equal to the opposite of the first signal and second processing means delivering a second output signal $X_2$, the said output signal being of the form $X_2 = X_{0,2} \cdot f_2(-y)$ with $f_2(-y)$ a second polynomial in y of the form $$f_2(-y) = \left[1 + \sum_{i=1}^{N} f_{i,2} \cdot (-y)^i\right];$$

$f_{i,2}$ being the coefficients of the said second polynomial; the processing device comprising:
  third processing means capable of generating two functions respectively called weighted difference $X_3$ and weighted sum $X_4$, these functions being such that $$X_3 = X_1 - \frac{X_{0,1}}{X_{0,2}} X_2 \text{ and } X_4 = X_1 + \frac{X_{0,1}}{X_{0,2}} \frac{f_{1,1}}{f_{1,2}} X_2$$

fourth processing means capable of calculating y starting from the knowledge of the weighted difference $X_3$ and of the weighted sum $X_4$.

Advantageously, the coefficients $X_{0,1}$, $X_{0,2}$, $f_{i,1}$ and $f_{i,2}$ depend on a parameter and can be put in the form of a polynomial function of the said parameter.

Advantageously, when the output signals $X_1$ and $X_2$ vary linearly with the input signal, the value of the parameter is determined by the value of the weighted sum $X_4$ and the value of the first signal y by the value of the weighted difference $X_3$.

Conventionally, the parameter T is the temperature.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The invention will be better understood and other advantages will become apparent upon reading the description that follows presented in a non-limiting manner and with reference to the appended figures among which.

MORE DETAILED DESCRIPTION

Figure 1:
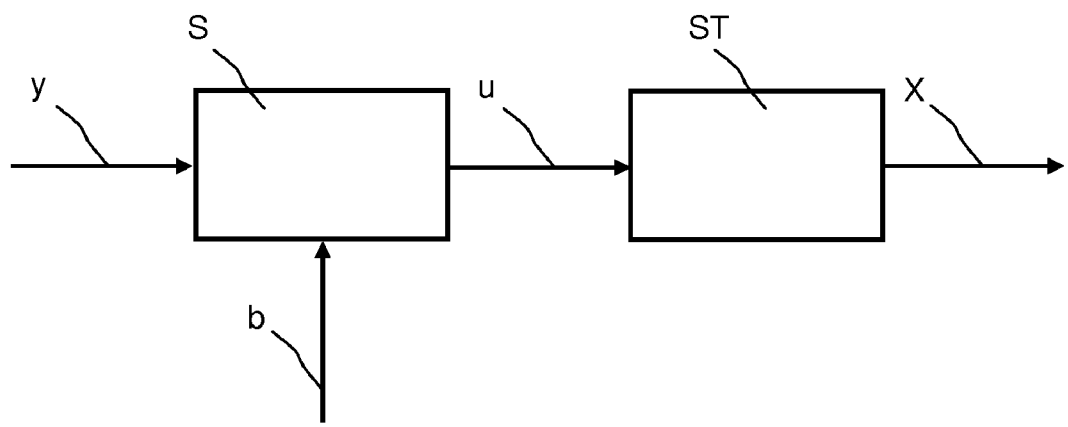
FIG. 1 shows the schematic block diagram of a single-channel processing system according to the prior art.
Figure 2:
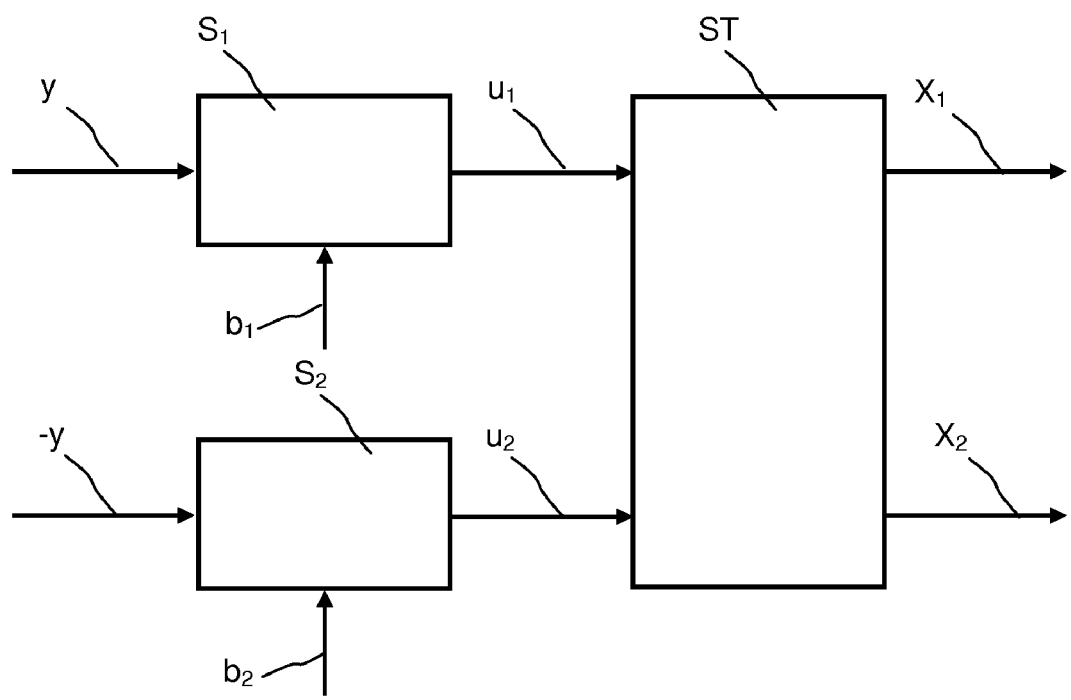
FIG. 2 shows the schematic block diagram of a differential processing system according to the invention.

The method according to the invention is based on the employment of a differential system. The signal processing according to the invention implements two systems $S_1$ and $S_2$ that respectively receive the input signal y and its opposite $-y$.

Each system returns a signal u over one channel. Thus, $u_1$ is on the channel 1 and $u_2$ is on the channel 2. A processing operation ST allows $u_1$ and $u_2$ to be demodulated in order to obtain two signals $X_1$ and $X_2$ varying according to polynomial functions $f_1$ and $f_2$ with, using the previous notations:

on the channel 1 $X_1 = X_{0,1} f_1(y) = X_{0,1}[1 + f_{1,1}y + f_{2,1}y^2 + \ldots]$ on the channel 2 $X_2 = X_{0,2} f_2(-y) = X_{0,2}[1 + f_{1,2}y + f_{2,2}y^2 + \ldots]$ $f_{i1}$ and $f_{i2}$ being the coefficients of the polynomial functions $f_1$ and $f_2$. It should be noted that it is practically always possible to decompose a function in this form. The differences between the parameters $X_{0,1}$ and $X_{0,2}$ and also between the coefficients of the polynomials $f_1$ and $f_2$ originate from the disparities between the two systems, which may be intentional in order to avoid spurious coupling effects, or otherwise, in which case coming from manufacturing tolerances.

The core of the method consists in combining the two equations in order to obtain two signals $X_3$ and $X_4$ by performing the aforementioned weighted sum and weighted difference:

$$X_3 = X_1 - \frac{X_{0,1}}{X_{0,2}} X_2 \qquad \text{Equation 1}$$

$$X_4 = X_1 + \frac{X_{0,1}}{X_{0,2}} \frac{f_{1,1}}{f_{1,2}} X_2 \qquad \text{Equation 2}$$

This then leads to:

$$X_3 = X_1 - \frac{X_{0,1}}{X_{0,2}} X_2 \qquad \text{Equation 3}$$

$$= X_{0,1}(f_{1,1} + f_{1,2})y + X_{0,1}(f_{2,1} - f_{2,2})y^2 + \ldots$$

$$X_4 = X_1 + \frac{X_{0,1}}{X_{0,2}} \frac{f_{1,1}}{f_{1,2}} X_2 \qquad \text{Equation 4}$$

$$= X_{0,1}\left(1 + \frac{f_{1,1}}{f_{1,2}}\right) + X_{0,1}\left(f_{2,1} + \frac{f_{1,1}}{f_{1,2}} f_{2,2}\right)y^2 + \ldots$$

The ratios $$\frac{X_{0,1}}{X_{0,2}} \text{ and } \frac{f_{1,1}}{f_{1,2}}$$

can be determined by calibration. If $X_0$ and the coefficients of f vary as a function of a parameter, such as, for example, the temperature T, then these parameters may be written according to a polynomial law. In this case, this yields:

$X_{0,1}(T) = X_{0,1}(T_0)[1 + \beta_1(T-T_0) + \beta_2(T-T_0)^2 + \ldots]$ and $f_{1,1}(T) = f_{1,1}(T_0)[1 + \delta_1(T-T_0) + \delta_2(T-T_0)^2 + \ldots]$ with T the effective temperature of the system and $T_0$ the temperature of the system during the calibration.

If they are analogous systems, $X_{0,2}$ and $f_{1,2}$ will vary in the same fashion as a function of temperature and this can be expressed as follows:

$X_{0,2}(T) = X_{0,2}(T_0)[1 + \beta_1(T-T_0) + \beta_2(T-T_0)^2 + \ldots]$ $f_{1,2}(T) = f_{1,2}(T_0)[1 + \delta_1(T-T_0) + \delta_2(T-T_0)^2 + \ldots]$ The ratios $$\frac{X_{0,1}}{X_{0,2}} \text{ and } \frac{f_{1,1}}{f_{1,2}}$$

are therefore independent of the temperature. They may then just be determined during a calibration. $X_3$ and $X_4$ may thus be determined from $X_1$ and $X_2$ without spoiling these expressions with errors due to the thermal variations. The calculation of $X_3$ and $X_4$ starting from $X_1$ and $X_2$ does not pose any particular technical problem and may be carried out by various electronic methods, either digital or analogue.

If f is a polynomial of degree 1, which represents the general case where the output signal X varies linearly with the input signal, then the equations 3 and 4 become:

$$X_3 = X_{0,1}(f_{1,1} + f_{1,2})y \qquad \text{Equation 3}$$

$$X_4 = X_{0,1}\left(1 + \frac{f_{1,1}}{f_{1,2}}\right) \qquad \text{Equation 4}$$

$X_4$ no longer depends on the input y. $X_4$ therefore only depends on the temperature. The operating temperature of the system can thus be determined using X4. Knowing the temperature, it is easy to determine the coefficients from the equation 3 which are $X_{0,1}$ and $f_{1,1}+f_{1,2}$. Indeed, the variation law with temperature for these coefficients can be determined during calibration. Knowing these coefficients, y is able to be determined starting from $X_3$.

In the case where the degree of f is greater than 1, it is considered that there exists a polynomial variation law for the coefficients $f_{i,1}$ and $f_{i,2}$ as a function of temperature, which is always true for physical phenomena. The equations 3 and 4 may then be written as being polynomials in y and T, with coefficients that can be determined by calibration. Starting from the values of $X_3$ and $X_4$, y and T are thus determined.

Thus, using the weighted sum and the weighted difference of $X_1$ and $X_2$, the input y and the temperature are able to be determined. The use of the equations 3 and 4 therefore allows the errors due to the temperature to be avoided.

It is observed that $X_3$ is zero in the absence of an input signal. In determining y starting from $X_3$, an error in the estimation of the parameters of the system leads to a scale factor error but no zero-bias error. This would not have been the case if X3 had been the simple difference of X1 and X2. A zero-bias equal to $X_{0,1}-X_{0,2}$ would then have resulted in the expression for the difference: $X_1-X_2$. Using the weighted difference allows this zero-bias error to be eliminated. The use of the weighted sum allows the dependence of X4 as a function of y to be limited since there is no linear dependency on y. Thus, thanks to the weighted sum and difference of $X_1$ and $X_2$, two quantities varying in a substantially different manner with temperature and the signal to be analysed y are obtained.

By determining y starting from $X_3$, the clock noise is avoided. Indeed, since the sampling moments in time of the output signals of the two systems are identical, the sampling clock noise is in common mode. The clock noise therefore has no direct effect.

Because of the noise affecting the system S, the signals X have a noise component that is additive and that may be denoted:

$$X_1 = \hat{X}_1 + b_1$$

$$X_2 = \hat{X}_2 + b_2$$

$\hat{X}_1$ and $\hat{X}_2$ being the signals in the absence of noise, and $b_1$ and $b_2$ being the noise components.

By using the weighted sum and difference of $X_1$ and $X_2$, a gain of 3 dB is obtained in terms of noise power in the estimation of y. Indeed, by considering f to be a polynomial of degree 1, the noise in the estimation of y is:

$$\frac{b_1 - \frac{X_{0,1}}{X_{0,2}}b_2}{X_{0,1}(f_{1,1}+f_{1,2})}$$

By considering that the noise components have the same power level on the two channels, the spectral power density of this noise is approximately:

$$\frac{1}{2f_1^2 X_{0,1}^2}SPD(b_1)$$

with SPD($b_1$): Spectral Power Density $b_1$.

The power level of the noise has therefore been divided by 2 by employing the weighted difference with respect to the power obtained by determining y directly from $X_1$.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A signal measurement and processing device comprising:

a first system receiving a first signal y and first processing means delivering a first output signal $X_1$, said output signal being of the form $X_1=X_{0,1}.f_1(y)$ with $f_1(y)$ a first polynomial in y of the form $$f_1(y) = 1 + \sum_{i=1}^{N} f_{i,1} \cdot y^i$$

$f_{i,1}$ being the coefficients of said polynomial;

a second system configured to receive a second signal $-y$ substantially equal to the opposite of the first signal and second processing means delivering a second output signal $X_2$, said output signal being of the form $X_2=X_{0,2}.f_2(-y)$ with $f_2(-y)$ a second polynomial in y of the form $$f_2(-y) = 1 + \sum_{i=1}^{N} f_{i,2} \cdot (-y)^i;$$

$f_{i,2}$ being the coefficients of the said second polynomial;

third processing means for generating two functions respectively called weighted difference $X_3$ and weighted sum $X_4$, these functions being such that $$X_3 = X_1 - \frac{X_{0,1}}{X_{0,2}}X_2 \text{ and } X_4 = X_1 + \frac{X_{0,1}}{X_{0,2}}\frac{f_{1,1}}{f_{1,2}}X_2$$

fourth processing means for calculating y starting from the knowledae of the weighted difference $X_3$ and of the weighted sum $X_4$, the ratios $$\frac{X_{0,1}}{X_{0,2}} \text{ and } \frac{f_{1,1}}{f_{1,2}}$$

being known.

2. The signal measurement and processing device according to claim 1, wherein the coefficients $X_{0,1}$, $X_{0,2}$, $f_{i,1}$ and $f_{i,2}$ depend on a parameter T and are in the form of a polynomial function of this parameter.

3. The signal measurement and processing device according to claim 2, wherein, when the output signals $X_1$ and $X_2$ vary linearly with the input signal, the value of the parameter is determined by the value of the weighted sum $X_4$ and the value of the first signal y by the value of the weighted difference $X_3$.

4. The signal measurement and processing device according to claim 3, wherein the parameter T is the temperature.

5. The signal measurement and processing device according to claim 2, wherein the parameter T is the temperature.

* * * * *